March 12, 1957     C. E. VERMEHREN     2,784,449
RECOVERY OF HYPOPHYSES FROM ANIMALS
Filed June 2, 1950
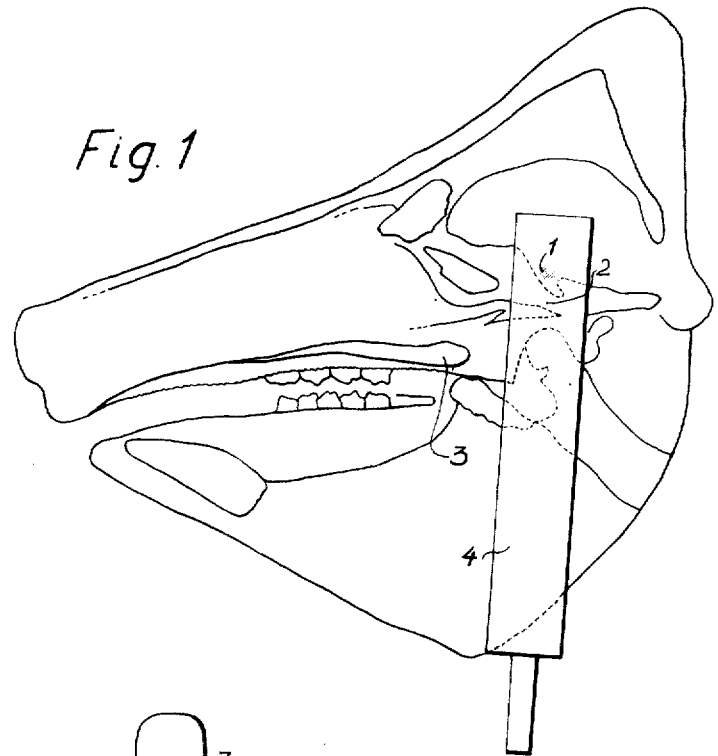
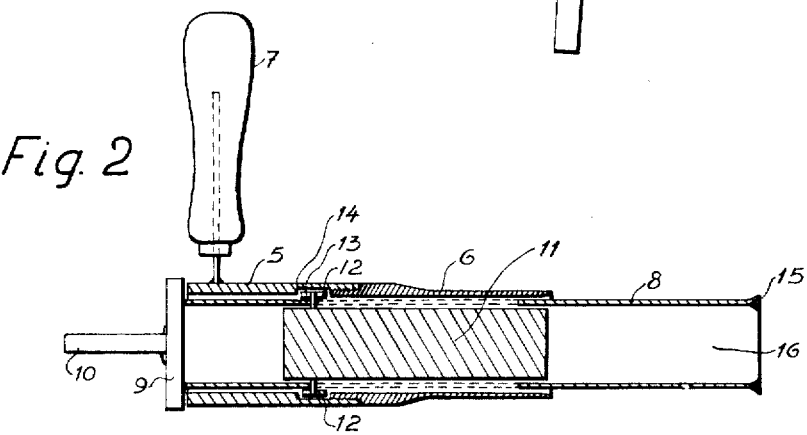
INVENTOR
CARL EMIL VERMEHREN
BY S. Shappirio
ATTORNEY _United States Patent Office_

2,784,449
Patented Mar. 12, 1957

2,784,449

RECOVERY OF HYPOPHYSES FROM ANIMALS

Carl Emil Vermehren, Kollund, Denmark

Application June 2, 1950, Serial No. 165,677

7 Claims. (Cl. 17—45)

As is generally known, the hypophysis of animals contains a plurality of active substances, which are not specific to the species and may, therefore, be used in human therapeutics, as well as substances which may serve as a raw material for preparations for veterinary use. Due to two different reasons, however, not all of the active substances contained in the hypophyses have been fully turned to account.

One of these reasons is that the recovery of the hypophysis has hitherto been comparatively costly, the hypophysis being a rather small gland that in pigs weighs only about 0.5–1 g. The normal recovery takes place in the following manner. The trimmed head with the mandible removed is split lengthwise after which the brain is removed manually. Then the hypophysis is removed by means of a pincer or a pointed needle from the cavity in the skull, the pituitary fossa, where it is concealed. The costs involved by these manipulations are comparatively high.

The other reason for not fully turning the hypophysis to account as a raw material in the medicinal industry is that some of the more important active substances in the hypophysis seem to be liable to decompose rather quickly subsequent to the killing of the animal, whereas the recovery of the hypophysis has hitherto taken place at a rather late stage of the treatment of the animal after killing. As above mentioned, namely, the hypophysis is only recovered after the head has been split, which can be done only when the head is separated from the carcass. As some of the muscles of the back are connected with the skull bones, a too early removal of the head from the carcass will result in a distortion of the latter, whereby it will stiffen in a distorted state. Therefore, the head is removed so long after death that the distortion is avoided with certainty. Thus in the normal procedure of slaughtering a couple of days may pass before the head is ready for splitting and removal of the hypophysis. This is probably the reason why for instance the yield per treated gland of certain hormones, produced only or mainly by the hypophysis, has been so little as to amount only to a fraction of the dose used per day in the treatment of human beings.

One of the objects of the present invention is to indicate certain methods, whereby it is possible to recover the hypophysis of animals at a time when the above mentioned decomposition of the active substances has not set in or at least is only negligible.

Another object is to ensure that decomposition does not take place after the recovery of the hypophysis.

A further object of the invention is a device by means of which the hypophysis can be recovered easily and with small costs at a suitable stage in the slaughtering process.

With these and other objects in view I will now proceed with a detailed description of my invention and the best manner in which it is carried out. I wish it to be understood, however, that the following details are in no way limitative to my invention, as certain modifications will be obvious to a person skilled in the art.

The hypophysis is situated in a small depression, the hypophyseal or pituitary fossa at the bottom of the cerebral cavity, just above the part of the skull called the body of the sphenoid bone, cfr. Sisson, "The Anatomy of the Domestic Animals," as revised by Grossman, 3rd edition revised, page 172.

The present method comprises drilling through the body of the sphenoid bone towards the hypophysis, thereby cutting out a cylindrical body consisting of flesh and bone and a small part of cerebral matter including the hypophysis, removing said body from the bit and removing the hypophysis from said body.

Preferably a shell bit is used, the diameter of which is about 1 inch, which is about twice the diameter of the hypophysis, to ensure that the drilling core enclose the hypophysis, even if the bit is not placed in exactly the right position for drilling. For every species or subspecies of animals a veterinary will have to locate the position of the sphenoid bone in relation to visible parts of the oral cavity and give exact directions to the worker, who makes the drilling.

According to the present invention the recovery of the hypophysis in the described manner may be carried out in an early stage after slaughtering or, if the animal is rendered unconscious, the recovery may even take place before the animal is killed, without thereby increasing the costs or diminishing the value of the slaughtered animal.

Thus according to an embodiment of the invention the hypophysis is drilled out after the animal has been rendered unconscious, for instance by means of electricity, but before stabbing the animal. Naturally this means that the drilling bit will have to pass through the flesh of the neck of the animal so that the drilling core will consist of rather much flesh, but this is of less importance as compared with the possibility of recovering the hypophysis in perfectly fresh condition before decomposition of the active substances can set in.

According to another embodiment of the invention the hypophysis is recovered after slaughtering the animal, but before the head is severed from the carcass. Even in this case substantially fresher glands are recovered than by the known methods, since the recovery can take place at any suitable moment after the slaughtering.

Thus the recovery may take place, when after slaughtering, singeing and rehairing the carcass is cut open. It is then possible to place the bit directly on the soft palate, so that the drilling core will contain only a minimum of other substance besides the hypophysis.

By providing the shell bit with expelling means the drilling core can be expelled immediately after the drilling operation and the hypophysis isolated at once and placed under conditions preventing decomposition of the active substances, for instance by deep freezing, dipping in a preserving liquid, injection of a preserving liquid or other suitable treatment. Alternatively the whole of the drilling core including the hypophysis may be subjected to such preserving treatment for later recovery of the hypophysis by skilled workers.

In the drawings,

Fig. 1 shows schematically the position of the hypophysis in a pig's head together with some of the more important bones of the skull, and Fig. 2 shows partly in section a preferred embodiment of a device suitable for the recovery of the hypophysis.

In Fig. 1 1 indicates the position of the hypophysis, 2 that of the sphenoid bone and 3 the posterior part of the hard palate. The outline of a shell bit for drilling out the hypophysis is indicated by 4.

The shell bit itself consists of a two-part case being indicated by 5 and 6. On part 5 is secured a handle 7 for directing the shell bit. Within the case 5, 6 a shell bit 8 is rotatably and displaceably mounted. At one end he shell bit is closed by an end plate 9 having a shaft 10 for connection to a hand drilling machine. Within the shell bit 8 there is mounted an expeller 11 having at one end pins 12 passing through longitudinal slots in the shell bit 8. The pins 12 are seated in recesses or holes in an annular bushing 13 which is rotatable in a recess 14 at the joint of the two parts of the outer case.

The shell bit 8 is provided with a toothed edge 15 so that it cuts easily through flesh and bone when rotated.

In the drilling operation the outer case 5, 6 is pressed against the end plate 9 whereby the extractor 11 is kept in the position shown in Fig. 2 leaving space for the drilling core as shown at 16. When the drilling operation is ended the shell bit is removed from the animal and the drilling core expelled by pressing the handle 7 towards the edge 15 of the shell bit, whereby the extractor 11 is also pressed towards said edge thereby expelling the drilling core.

The invention is not limited to the use of the device described above, as any means, by which a section of the body of the sphenoid bone may be cut out with the certainty and rapidness necessary, can be used, such as a tubular bit or a spoon bit.

I claim:

1. A method for the recovery of the hypophysis from animals having the usual sphenoid bone above which the hypophysis is situated in the pituitary fossa at the bottom of the cerebral cavity comprising locating the sphenoid bone behind which the hypophysis lies, cutting a cylindrical core through the sphenoid bone which core encompasses the hypophysis, removing the core, and isolating the hypophysis from said core.

2. A method as set forth in claim 1, in which the hypophysis is recovered after the animal has been rendered unconscious, but before the killing of the animal.

3. A method as set forth in claim 1, in which the hypophysis is recovered after the animal has been killed, but before the head is severed from the carcass.

4. A method as set forth in claim 1, in which the hypophysis is recovered after cutting open the carcass.

5. A method as set forth in claim 1, including the step of subjecting said core to a preserving treatment in order to prevent decomposition of the active substances of the hypophysis.

6. A method as set forth in claim 1, in which the hypophysis is subjected to a preserving treatment in order to prevent decomposition of the active substances.

7. A method as set forth in claim 1 in which the animals are pigs.

References Cited in the file of this patent

UNITED STATES PATENTS

| 847,133 | Velasco | Mar. 12, 1907 |
| 1,485,681 | Lake | Mar. 4, 1924 |
| 2,343,250 | Volle | Mar. 7, 1944 |
| 2,433,125 | Kane | Dec. 23, 1947 |
| 2,492,158 | Le Compte et al. | Dec. 27, 1949 |
| 2,504,075 | Karle | Apr. 11, 1950 |

OTHER REFERENCES

Textbook of Endocrinology by Hans Selye, published by Acta Endocrinologica, University of Montreal, Montreal, Canada, pages 231 to 234, 1947.